United States Patent Office 3,621,655
Patented Nov. 23, 1971

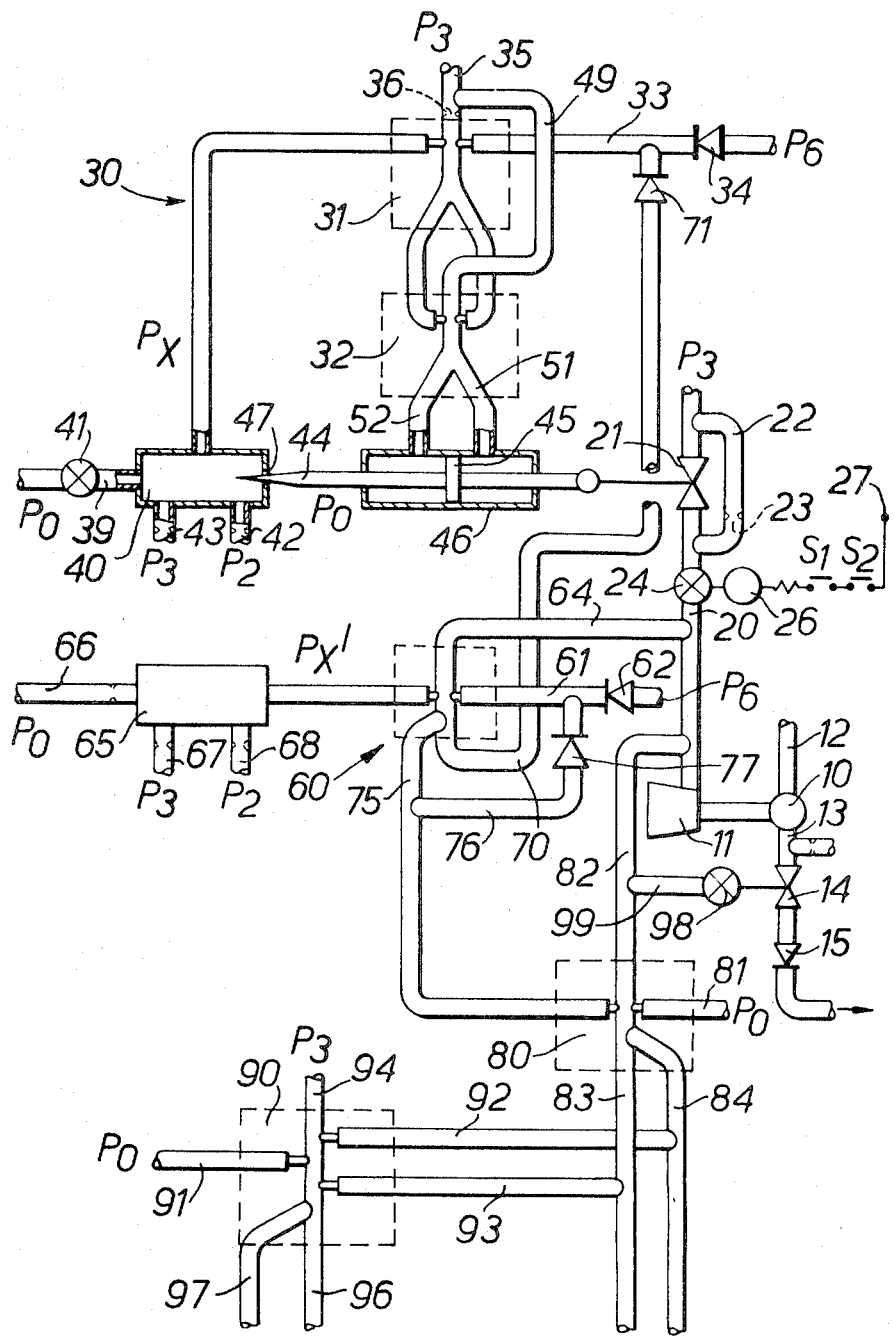

3,621,655
FUEL CONTROL SYSTEM FOR A GAS
TURBINE ENGINE
David J. Hawes, Derbyshire, England, assignor to Rolls-
Royce Limited, Derby, Derbyshire, England
Filed Mar. 16, 1970, Ser. No. 19,713
Claims priority, application Great Britain, Mar. 27, 1969,
16,164/69
Int. Cl. F02c 9/06, 9/08
U.S. Cl. 60—39.28                              10 Claims

ABSTRACT OF THE DISCLOSURE

The invention concerns a fuel control system for a gas turbine engine comprising a fuel pump and a closed loop fluid logic system including proportional amplifier means the output of which is connected to control the delivery of the said fuel pump, and the effective input of which is a function of jet pipe pressure and at least one compressor pressure.

---

This invention concerns a fuel control system for a gas turbine engine, and although it is not so restricted, it will be particularly described with reference to a reheat fuel control system for a gas turbine engine having variable jet propulsion nozzle means.

According to the present invention in its broadest aspect, there is provided a fuel control system for a gas turbine engine comprising a fuel pump and a closed loop fluid logic system including proportional amplifier means the output of which is connected to control the delivery of the said fuel pump, and the effective input of which is a function of jet pipe pressure and at least one compressor pressure.

Preferably the said effective input is a function of the difference between the jet pipe pressure and a variable reference pressure, the latter including as components the said at least one compressor pressure and a feedback controlled by the output of the said proportional amplifier means.

Fuel pump delivery may be controlled by a throttle valve adapted to be actuated by a ram which is connected to said output, movement of said ram being arranged to vary the said reference pressure.

Optionally, the said reference pressure is generated in a splitter having as inputs respective functions of atmospheric pressure, low pressure compressor delivery pressure and high pressure compressor delivery pressure, and having an orifice the area of which is controlled by a tapered needle attached to the piston of the said ram for movement therewith.

The fuel pump is preferably drivingly connected to an air turbine the air supply to which is controlled by said throttle valve.

The fuel control system of this invention is preferably a reheat fuel control system, the said engine has preferably at least one variable area jet propulsion nozzle, and there may be a nozzle area control system which includes a reheat light-up sensor device.

The said device is preferably a fluid logic monostable amplifier.

The said device may be adapted to compare respective functions of jet pipe pressure and a reference pressure which in turn is a function of at least one compressor pressure, the output of said device being connected to control opening and closing of the or each propulsion nozzle.

Preferably, the last-mentioned output is passed to fluid logic gate devices to move the or each propulsion nozzle between "Nozzle Close," "Nozzle Pre-Open" and "Nozzle Open" positions.

Conveniently, each said gate device is a monostable.

The last-mentioned reference pressure may be generated in a splitter having as inputs respective functions of atmospheric pressure, low pressure compressor delivery pressure and high pressure compressor delivery pressure.

Preferably the stable output of the sensor device is connected to the input of the proportional amplifier means, the arrangement being such that, before the reheat combustion equipment is lit up, the said stable output overrides the jet pipe pressure input signal to the said amplifier means, but as soon as the said equipment is lit up, the said stable output is disconnected from the said input of the proportional amplifier means.

The invention also includes a gas turbine engine having a fuel system as set forth above.

One preferred embodiment of the invention will now be described, merely by way of example, with reference to the accompanying drawing, which is a schematic diagram of the fuel control system in accordance with the present invention.

Referring to the drawing, there is shown a fuel control system for a gas turbine engine (not shown) including a fuel pump 10 which is drivingly connected to an air turbine 11 and having a low pressure fuel inlet line 12 and a high pressure fuel outlet line 13. The fuel control system is preferably a reheat system and the fuel outlet line 13 is accordingly connected to a reheat fuel manifold (not shown) via a high pressure throttle valve 14 and a pressurizing valve 15.

The air turbine 11 receives air via an inlet pipe 20 which is fed in operation with compressor delivery air. In the preferred embodiment of the present invention, the gas turbine engine is assumed to have, in axial flow series, low and high pressure compressors, main combustion equipment, high and low pressure turbines, reheat combustion equipment and at least one propulsion nozzle which has means for varying its area, none of these per se known elements being shown.

Accordingly, the inlet pipe 20 is fed with high pressure compressor delivery air, hereinafter referred to as $P_3$ air. In the pipe 20 is located an air throttle valve 21 which is normally closed as described below, and the throttle valve 21 is by-passed by a branch pipe 22 having a fixed orifice 23 therein. The air throttle valve 21 has a control ram including a piston 45 slidable in a cylinder 46 and described in more detail below. Downstream of the junction of the branch pipe 22 with the main pipe 20 a shut-off cock 24 is connected in the pipe 20. This shut-off cock 24 is operable by a motor 26 which in turn is actuatable by an electric circuit including two switches $S_1$ and $S_2$ connected to each other in series and connected to a high tension terminal 27. The switch $S_1$ is a reheat selector switch operable by the pilot of an aircraft in which the gas turbine engine is installed, while the switch $S_2$ is provided as a preferred option and is operable by a speed signal from the engine.

Thus, once the shut-off cock 24 is opened, $P_3$ air will pass through the pipe 20 and the by-pass or branch pipe 22 to the air turbine 11 so as to drive the fuel pump 10. At the same time, $P_3$ air will pass through a "Nozzle Pre-Open" line 82 communicating with a fluid logic gate device 80 to pre-open the propulsion nozzle means to a partially open position, as described in more detail below. The line 82 has a branch line 99 in which is located a shut-off cock 98 for the high pressure fuel throttle valve 14, and thus $P_3$ air will be supplied to the shut-off cock 98 as soon as the shut-off cock 24 is opened.

As the pump 10 accelerates, the fuel pressure in the pipe 13 will rise sufficiently to open the pressurising valve 15 and a small flow of fuel will pass to the pipelines and manifolds of the reheat combustion equipment and will flow into the jet pipe, wherein the fuel is ignited by a continuously burning pilot flame, thus causing an increase in the jet pipe pressure hereinafter referred to as $P_6$ pressure. The pressure $P_6$ is sensed by a fuel control unit generally indicated at 30 and a lighting sensor device generally indicated at 60.

Describing first the fuel control unit, which may be more correctly termed a pressure ratio control unit, it comprises a closed loop fluid logic system incorporating two fluid logic proportional amplifiers 31 and 32 connected in series. The first proportional amplifier 31 has two control ports to one of which is connected the jet pipe pressure $P_6$ via a line 33 having therein a one-way valve 34 and to the other of which is connected a variable reference pressure $Px$, described in more detail below. The input of the proportional amplifier 31 is $P_3$ air supplied through a line 35 having a fixed resistor 36 therein.

The reference pressure signal $Px$ is generated in a three-orifice splitter device 40 having as inputs atmospheric pressure hereinafter referred to the $P_0$ air through a line 39 having an adjustable valve 41, low pressure compressor delivery air, hereinafter referred to as $P_2$ air through a line 42 having a fixed resistor therein and $P_3$ air supplied through a line 43 also having a fixed restrictor therein. Furthermore, the splitter 40 is provided with an orifice 47 in which a tapered needle 44 is slidably movable, the tapered needle 44 being integrally attached to the piston 45. The orifice 47 communicates with the atmosphere. When the needle 44 moves to the left as seen in the drawing, the throttle valve 21 will be moved towards its closed position.

The second proportional amplifier 32 receives $P_3$ air via a by-pass pipe 49 which communicates with the pipe 35 upstream of the fixed resistor 36, and the control ports of the amplifier 32 are each connected to the output of the amplifier 31. The output of the amplifier 32 may go to one or the other side of the piston 45 through respective pipes 51 and 52.

It will accordingly be understood that the arrangement of the needle 44 movable in the orifice 47 and attached to, and for movement with, the piston 45 represents a position feedback arrangement from the control ram of the air throttle valve 21. Thus if the jet pipe pressure $P_6$ is greater than the reference pressure $Px$, the throttle valve 21 will be moved towards its closed position and vice versa.

A fluid logic system is also employed to control the opening and closing of the or each variable area jet propulsion nozzle of the gas turbine engine, and this nozzle area control system will now be described. The heart of this system is the lighting sensor device 60 which is, in fact, a monostable fluid logic amplifier. To the control ports of this amplifier 60 the jet pipe pressure $P_6$ is applied through a line 61 having a one-way valve 62 therein, while a reference pressure $Px'$ is applied to the other control port. The amplifier 60 receives $P_3$ air from the line 20 via a branch line 64.

To generate the reference pressure $Px'$ a second splitter device 65 is provided which has three conduits 66, 67 and 68, with respective fixed resistors therein, and which communicate with, or are fed with, respectively, $P_0$ air, $P_3$ air and $P_2$ air.

The normal or stable output of the monostable amplifier 60 is fed therefrom via a line 70 having a one-way valve 71 therein to the line 33.

When in operation the jet pipe pressure $P_6$ is greater than the reference pressure $Px'$ the output of the monostable amplifier 60 switches from the line 70 to the line 75 which is a "NOZZLE OPEN" line and this causes the propulsion nozzle to be moved to its fully open position. This output is also fed via a line 76, communicating with the line 75 and having a one-way valve 77 therein, to the $P_6$ air input line 61 so as to "latch" the nozzle in its fully open position. The pressure signal in the line 75 is fed to one control port of a further monostable fluidic amplifier 80, the other control port of which is connected to $P_0$ air through a line 81. The input line 82 to the amplifier 80, as already described, communicates directly with the line 20 upstream of the air turbine 11 and thus carries $P_3$ air in operation. The normal or stable output line 83 of the monostable amplifier 80 passes to the ram or rams controlling the area of each nozzle to pre-open the latter. However, when a pressure signal is present in the line 75, the pressure therein will be greater than that in the line 81 and the monostable amplifier 80 will be switched to its other output line 84 connected to the ram or rams of the nozzle to open the latter. Thus the monostable amplifier 80 acts, in effect, as a gate device.

In order to close the nozzle, a further monostable amplifier device 90 is provided which has three control ports, one of which communicates with $P_0$ air through a line 91, while the other two ports, which face the $P_0$ port, are connected to respective lines 92 and 93 respectively communicating with the lines 84 and 83. The input to the device 90 is $P_3$ air through a line 94.

It will be appreciated that the monostable device 90 will act as a gate and when neither the "NOZZLE PRE-OPEN" or the "NOZZLE OPEN" signal is present, the output of the device 90 will be connected to the ram or rams of the nozzle via a "NOZZLE CLOSE" line 96 to close that nozzle, while if the signals 92 and 93 are present, the output of the device 90 will pass to an output line 97 which may for instance communicate with atmosphere or is otherwise arranged to have no effect on the nozzle.

The arrangement of the valves 71 in line 70 and valve 34 in the line 33 is such that before the reheat combustion equipment is fully "lit up" or switched on, the output of the lighting sensor device, that is to say, of the monostable amplifier 60 will override the jet pipe pressure or $P_6$ signal in the line 33 causing the air throttle 21 to be selected "shut." However, as soon as "light-up" occurs in the reheat combustion equipment, the reverse will happen and the control unit 30 will be in control of the air throttle valve 21.

If a "NOZZLE PRE-OPEN" signal is required, it will be noticed that this signal is taken from downstream of the shut-off cock 24 and therefore as soon as this shut-off cock 24 is open the nozzle moves to its "pre-open" position. During operation of the reheat combustion equipment therefore, the fuel flow is controlled by the control unit 30 via the air throttle valve 21 to maintain the engine pressure ratios at predetermined values.

On cancelling or switching off reheat, the shut-off cock 24 closes and the air throttle valve 21 is shut by the unit 30 for the reasons explained hereinabove with the result that the turbine 11 will decelerate and so will also the fuel pump 10. The high pressure fuel shut-off cock 14 will also close. As soon as the shut-off cock 24 is closed, $P_3$ air will be removed from the line 64 and thus from the lighting sensor device 60 so as to switch the output normal to the stable or normal line 70, whereby to remove both the "NOZZLE OPEN" and "NOZZLE PRE-OPEN" signals from the monostable amplifier or gate device 80. This will mean in turn that the pressure is removed from the lines 92 and 93 and thus the monostable amplifier or gate device 90 will revert to its stable or "NOZZLE CLOSE" position.

It will be appreciated from the foregoing that the illustrated embodiment of the present invention provides an accurate and relatively simple fuel control system in which the number of moving parts is reduced to a minimum and which does not utilize valves requiring an external drive.

I claim:

1. A fuel control system for a gas turbine engine comprising: a fuel pump; and a closed loop fluid logic system, said closed loop fluid logic system including a proportional amplifier means having an output connected to control delivery of said fuel pump and having an effective input which is a function of a difference between a jet pipe pressure and a variable reference pressure, said variable reference pressure including as components at least one compressor pressure and a feed-back controlled by said output of said amplifier means, a throttle valve to control delivery of said fuel pump, a ram and piston means for actuating said throttle valve, said ram and piston means being operatively connected to said output and movement of said ram and piston means being arranged to vary said reference pressure, a splitter in which said reference pressure is generated, said splitter having inputs which are respective functions of atmospheric pressure, low pressure compressor delivery pressure, and high pressure compressor delivery pressure, said splitter also having an orifice, and a tapered needle attached to said ram and piston means for movement therewith, said tapered needle coacting with said orifice to control area of said orifice.

2. A fuel control system for a gas turbine engine comprising: a fuel pump; and a closed loop fluid logic system, said closed loop fluid logic system including a proportional amplifier means having an output connected to control delivery of said fuel pump and having an effective input which is a function of a difference between a jet pipe pressure and a variable reference pressure, said variable reference pressure including as components at least one compressor pressure and a feed-back controlled by said output of said amplifier means, a throttle valve to control delivery of said fuel pump, a ram and piston means for actuating said throttle valve, said ram and piston means being operatively connected to said output and movement of said ram and piston means being arranged to vary said reference pressure, and an air turbine drivingly connected to said fuel pump, said air turbine having an air supply controlled by said throttle valve.

3. A system as claimed in claim 1 including an air turbine drivingly connected to said fuel pump, said air turbine having an air supply controlled by said throttle valve.

4. A system as claimed in claim 1 wherein the said engine has at least one variable area jet propulsion nozzle, and a nozzle area control system which includes a reheat light-up sensor device.

5. A system as claimed in claim 4 wherein the said device is a fluid logic monostable amplifier.

6. A system as claimed in claim 4 wherein the said device is adapted to compare respective functions of jet pipe pressure and a reference pressure which in turn is a function of at least one compressor pressure, the output of said device being connected to control opening and closing of the or each propulsion nozzle.

7. A system as claimed in claim 6 wherein the last-mentioned output is passed to fluid logic gate devices to move the or each propulsion nozzle between "nozzle close," "nozzle pre-open" and "nozzle open" positions.

8. A system as claimed in claim 7 wherein each said gate device is a monostable.

9. A system as claimed in claim 6 wherein the last-mentioned reference pressure is generated in a splitter having as inputs respective functions of atmospheric pressure, low pressure compressor delivery pressure and high pressure compressor delivery pressure.

10. A system as claimed in claim 6 wherein the stable output of the sensor device is connected to the input of the proportional amplifier means, the arrangement being such that, before the reheat combustion equipment is lit up, the said stable output overrides the jet pipe pressure input signal to the said proportional amplifier means but as soon as the said equipment is lit up, the said stable output is disconnected from the said input of the proportional amplifier means.

References Cited

UNITED STATES PATENTS

| | | | |
|---|---|---|---|
| 3,488,948 | 1/1970 | Cornett | 60—39.28 |
| 3,439,497 | 4/1969 | Cross | 60—39.28 |
| 3,243,955 | 4/1966 | Frank | 60—39.28 X |

CLARENCE R. GORDON, Primary Examiner

U.S. Cl. X.R.

60—243; 137—81.5